United States Patent
Ye et al.

(10) Patent No.: US 12,524,249 B2
(45) Date of Patent: Jan. 13, 2026

(54) REGISTER CONFIGURATION SYSTEM, METHOD, AND ELECTRONIC DEVICE

(71) Applicants: VERISILICON MICROELECTRONICS (SHANGHAI) CO., LTD., Shanghai (CN); VERISILICON MICROELECTRONICS (CHENGDU) CO., LTD., Sichuan (CN)

(72) Inventors: Ting Ye, Shanghai (CN); Jiebin Mu, Shanghai (CN); Huiming Zhang, Shanghai (CN); Jia Li, Shanghai (CN)

(73) Assignees: VERISILICON MICROELECTRONICS (SHANGHAI) CO., LTD., Shanghai (CN); VERISILICON MICROELECTRONICS (CHENGDU) CO., LTD., Sichuan (CN)

( * ) Notice: Subject to any disclaimer, the term of this patent is extended or adjusted under 35 U.S.C. 154(b) by 187 days.

(21) Appl. No.: 18/568,403

(22) PCT Filed: Sep. 19, 2023

(86) PCT No.: PCT/CN2023/119839
§ 371 (c)(1),
(2) Date: Dec. 8, 2023

(87) PCT Pub. No.: WO2025/059874
PCT Pub. Date: Mar. 27, 2025

(65) Prior Publication Data
US 2025/0094180 A1 Mar. 20, 2025

(51) Int. Cl.
*G06F 9/445* (2018.01)

(52) U.S. Cl.
CPC ................ *G06F 9/44505* (2013.01)

(58) Field of Classification Search
CPC ...... G06F 9/44505; G06F 9/3012; G06F 3/14; G06F 9/30101; G06F 9/485;
(Continued)

(56) References Cited

U.S. PATENT DOCUMENTS 7,640,421 B1 * 12/2009 Garlick .................. G06F 9/461
712/228
10,750,377 B1 * 8/2020 Zihir ..................... H04W 16/28
(Continued)

*Primary Examiner* — Faisal M Zaman
(74) *Attorney, Agent, or Firm* — BCF LLP

(57) ABSTRACT

The present disclosure provides a register configuration system, method, and electronic device. The register configuration system includes a display processing unit, memory, and a hardware automatic control unit. The display processing unit includes multiple registers. The memory includes at least one pre-stored configuration instruction, wherein the configuration instruction is configured to indicate target registers that need to be configured in the display processing unit. The hardware automatic control unit is connected to a register configuration interface of the display processing unit. The hardware automatic control unit is configured to receive a startup command and, based on the startup command, retrieve and parse the configuration instructions from the memory. After parsing the configuration instructions, the hardware automatic control unit configures the target registers in the display processing unit. The startup command includes the storage address of the configuration instructions.

9 Claims, 3 Drawing Sheets

(58) Field of Classification Search
CPC ............ G06F 11/0772; G09G 2320/06; G09G 2320/08; G09G 2330/026; G09G 2360/06; G09G 2360/08; G09G 2360/10; G09G 5/006

See application file for complete search history.

(56) References Cited

U.S. PATENT DOCUMENTS

| | | | | |
|---|---|---|---|---|
| 10,803,007 | B1* | 10/2020 | Volpe | G06F 15/7882 |
| 12,475,524 | B2* | 11/2025 | Vilim | G06T 1/60 |
| 2003/0065914 | A1* | 4/2003 | Saw-Chu | G06F 9/4812 |
| | | | | 713/1 |
| 2006/0271772 | A1* | 11/2006 | Woundy | H04N 21/4432 |
| | | | | 713/1 |
| 2007/0159491 | A1* | 7/2007 | Panabaker | G06F 1/3218 |
| | | | | 345/553 |
| 2009/0033645 | A1* | 2/2009 | Araya | G09G 3/3648 |
| | | | | 345/87 |
| 2011/0084972 | A1* | 4/2011 | Duluk, Jr. | G06F 9/3888 |
| | | | | 345/501 |
| 2012/0266165 | A1* | 10/2012 | Cen | G06F 9/45541 |
| | | | | 718/1 |
| 2013/0246745 | A1* | 9/2013 | Hatano | G06F 9/3836 |
| | | | | 712/205 |
| 2016/0004293 | A1* | 1/2016 | Park | G09G 3/344 |
| | | | | 345/204 |
| 2017/0229052 | A1* | 8/2017 | Veernapu | G09G 3/2003 |
| 2018/0176590 | A1* | 6/2018 | Symes | H04N 19/119 |
| 2018/0349137 | A1* | 12/2018 | Pillilli | G06F 9/4418 |
| 2024/0005996 | A1* | 1/2024 | Siviero | G11C 16/3459 |

* cited by examiner

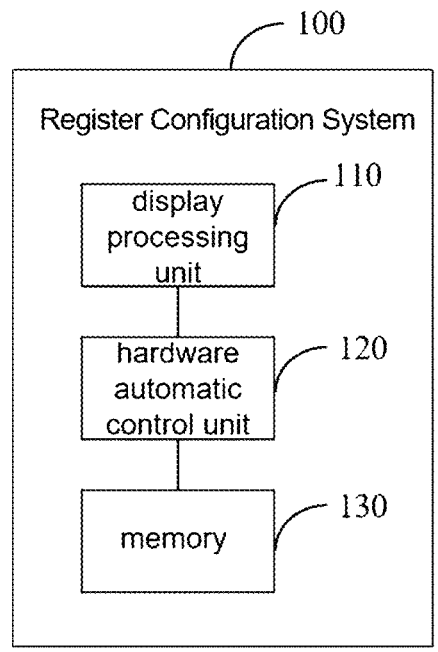
FIG. 1
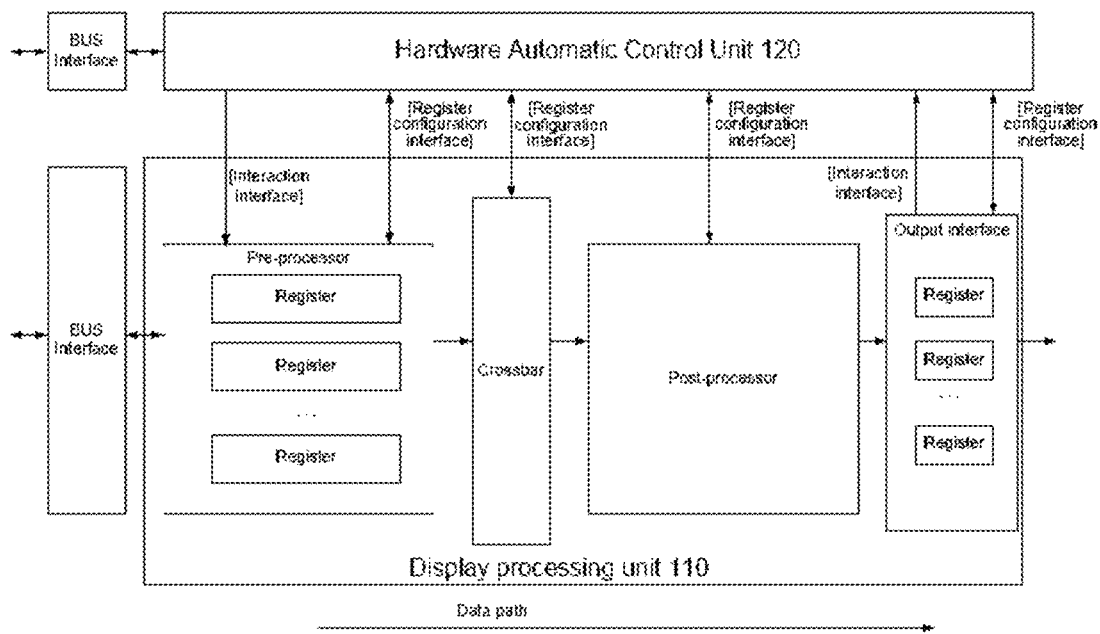
FIG. 2
FIG. 3

REGISTER CONFIGURATION SYSTEM, METHOD, AND ELECTRONIC DEVICE

The present disclosure is a National Stage of International Application No. PCT/CN2023/119839 filed on Sep. 13, 2023, entitled "REGISTER CONFIGURATION SYSTEM, METHOD, AND ELECTRONIC DEVICE".

TECHNICAL FIELD

The present disclosure relates to the technical field of computers, in particular to a register configuration system, method, and electronic device.

BACKGROUND ART

With the growing demand for various high-definition displays, the entire algorithm unit of the display processing unit (DPU) and its internal processing flow are becoming increasingly complex. Consequently, various control processes are becoming more intricate. At the same time, the number of registers that software needs to configure has significantly increased, and the interaction between software and hardware has become more frequent. These new challenges make it increasingly difficult and impractical to rely solely on the traditional central processing unit (CPU) control method to handle various control and configuration processes. In other words, this operating method is no longer able to meet the practical performance requirements.

SUMMARY

The present disclosure provides a register configuration system, method, and electronic device to address the problem in the existing technology, where it is difficult to meet practical performance requirements by relying on the traditional CPU control method to handle various control and configuration processes.

In the first aspect, the present disclosure provides a register configuration system, comprising a display processing unit, a memory, and a hardware automatic control unit. The display processing unit comprises multiple registers. The memory comprises at least one pre-stored configuration instruction, wherein the configuration instruction is configured to indicate target registers that need to be configured in the display processing unit. The hardware automatic control unit is connected to a register configuration interface of the display processing unit. The hardware automatic control unit is configured to receive a startup command and, based on the startup command, retrieve and parse the configuration instructions from the memory. After parsing the configuration instructions, the hardware automatic control unit configures the target registers in the display processing unit. The startup command comprises the storage address of the configuration instructions.

In the embodiments of the present disclosure, register configuration is performed through the hardware automatic control unit, which replaces the traditional method of using the CPU for register configuration. Therefore, the configuration bandwidth burden on the CPU is minimized; and even when the number of registers that need configuration increases, the solution enables the configuration of registers, thereby meeting the optimization requirements of the display processing flow.

In conjunction with the technical solution provided in the first aspect, in some possible embodiments, the hardware automatic control unit is also connected to interaction interfaces of each data path of the display processing unit, wherein different data paths comprise different registers. The hardware automatic control unit is further configured to send a configuration start command representing the start of configuring the target registers to the data paths and to receive configuration status signals fed back from the data paths. The configuration status signals represent whether all the registers comprised in the data paths have completed their configuration.

In the embodiments of the present disclosure, the hardware automatic control unit, through data interaction with each data path of the display processing unit, can clearly indicate the register configuration status of each data path of the display processing unit. This makes it easier for the hardware automatic control unit to determine whether there are data paths that still require register configuration.

In conjunction with the technical solution provided in the first aspect, in some possible embodiments, the display processing unit comprises multiple data paths. The hardware automatic control unit is further configured to record the configuration status of the registers in each data path based on the configuration status signals fed back by each data path. The configuration status represents whether the registers have completed their configuration.

In the embodiments of the present disclosure, the hardware automatic control unit, by recording the configuration status of the registers in each data path, facilitates the subsequent determination of which data paths still require register configuration.

In conjunction with the technical solution provided in the first aspect, in some possible embodiments, the register configuration system also comprises a central processing unit. The central processing unit is connected to the hardware automatic control unit and the central processing unit is configured to send the startup command to the hardware automatic control unit.

In conjunction with the technical solution provided in the first aspect, in some possible embodiments, the hardware automatic control unit is further configured to send its internal status to the central processing unit. The central processing unit determines whether the hardware automatic control unit is functioning properly based on the received status of the hardware automatic control unit. In case of any anomalies in the hardware automatic control unit, the central processing unit sends an interrupt command to the hardware automatic control unit, wherein the interrupt command is configured to instruct the hardware automatic control unit to stop working.

In the embodiments of the present disclosure, by monitoring the internal status of the hardware automatic control unit through the central processing unit, it is possible to send an interrupt command to the hardware automatic control unit if any anomalies are detected in the hardware automatic control unit, thereby causing the hardware automatic control unit to stop working. The reliability of the register configuration system is improved by preventing register configuration errors caused by abnormalities in the hardware automatic control unit.

In conjunction with the technical solution provided in the first aspect, in some possible embodiments, the configuration instructions comprise an instruction type, a number of the target registers whose addresses are consecutive, an offset address of a first target register, an instruction text, and an instruction end flag.

In conjunction with the technical solution provided in the first aspect, in some possible embodiments, the instruction text records the calculation method for the actual configuration address of each target register. The hardware automatic control unit is specifically configured to parse the configuration instruction based on the instruction type, so as to obtain the number of the target registers, the offset address of the first target register, the instruction text, and the instruction end flag. According to the number of the target registers whose addresses are consecutive, the offset address of the first target register, and the calculation method provided in the instruction text, the actual configuration address for each target register is determined. Subsequently, each target register is configured based on the actual configuration address of each target register.

In the embodiments of the present disclosure, because the instruction text records the calculation method for the actual configuration address of each target register, by combining the number of the target registers whose addresses are consecutive and the offset address of the first target register, it is possible to calculate the addresses of the target registers that need configuration. This allows the configuration of multiple registers with a single instruction, reducing the number of configuration instructions that need to be sent and, consequently, improving the configuration efficiency.

In conjunction with the technical solution provided in the first aspect, in some possible embodiments, the instruction text also records a calculation method for a total number of the target registers whose addresses are consecutive. The hardware automatic control unit is specifically configured to determine the total number of the target registers whose addresses are consecutive based on the number of the target registers whose addresses are consecutive and the calculation method for the total number of the target registers. According to the total number of the target registers whose addresses are consecutive, the offset address of the first target register, and the instruction text, the actual configuration address for each target register is determined.

In the embodiments of the present disclosure, due to the limited length of the field in the configuration instruction configured to record the number of the target registers whose addresses are consecutive, in cases where the number of the target registers whose addresses are consecutive is large, it is possible to record a calculation method for the total number of the target registers whose addresses are consecutive in the instruction text, thereby determining the total number of the target registers whose addresses are consecutive. There is no need to split it into multiple configuration instructions, which reduces the number of configuration instructions that need to be sent, thus improving configuration efficiency.

In the second aspect, the present disclosure provides a register configuration method, applied to the hardware automatic control unit in the register configuration system of the first aspect and/or any possible embodiments thereof. The method comprises: receiving a startup command; retrieving and parsing the configuration instructions from the memory based on the startup command; and configuring the target registers in the display processing unit based on the parsed configuration instructions.

In a third aspect, the present disclosure provides an electronic device, comprising the register configuration system of the first aspect and/or any possible embodiments thereof.

The beneficial effect of the present disclosure is that it uses the hardware automatic control unit to configure registers in the display processing unit, which replaces the traditional method of using the CPU for register configuration. This significantly reduces the configuration bandwidth burden on the CPU. Even when the number of registers to be configured increases, the solution can still efficiently configure the registers, fulfilling the optimization requirements for the display processing flow.

BRIEF DESCRIPTION OF DRAWINGS

To more clearly illustrate the technical solutions of the embodiments of the present disclosure, the following will briefly introduce the drawings used in the embodiments. It should be understood that the following drawings only show some embodiments of the present disclosure, and therefore they should not be regarded as a limitation on the scope. Those ordinary skilled in the art can also obtain other related drawings based on these drawings without inventive effort.

FIG. 1 is a structural diagram of a first type of register configuration system shown in the embodiments of the present disclosure;

FIG. 2 is a structural schematic diagram of a connection between a hardware automatic control unit and a display processing unit shown in the embodiments of the present disclosure;

FIG. 3 is a schematic view of an instruction end flag shown in the embodiments of the present disclosure;

FIG. 4 is a structural schematic diagram of the first type of configuration instruction shown in the embodiments of the present disclosure;

FIG. 5 is a structural schematic diagram of a second type of configuration instruction shown in the embodiments of the present disclosure;

FIG. 6 is a structural schematic diagram of a third type of configuration instruction shown in the embodiments of the present disclosure;

FIG. 7 is a structural schematic diagram of a fourth type of configuration instruction shown in the embodiments of the present disclosure;

DETAILED DESCRIPTION OF EMBODIMENTS

Figure 8:
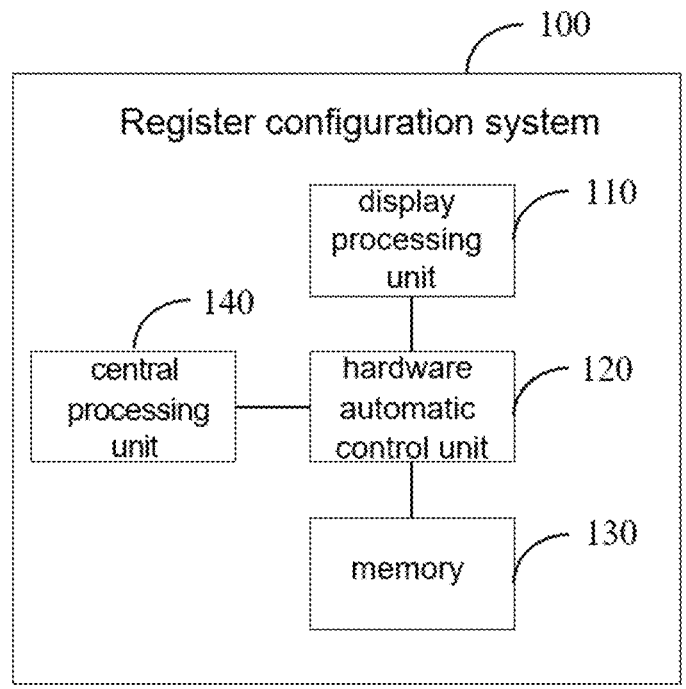
FIG. 8 is a structural diagram of the second type of register configuration system shown in the embodiments of the present disclosure.

The technical solutions in the embodiments of the present disclosure will be described below with reference to the drawings in the embodiments of the present disclosure.

It should be noted that similar numerals and letters denote similar terms in the following drawings, so that once an item is defined in one drawing, it does not need to be further discussed in subsequent drawings. Also, in the description of the present disclosure, relationship terms such as "first" and "second" are used only to distinguish one entity or operation from another, without necessarily requiring or implying any such actual relationship or order between those entities or operations. Furthermore, the terms "comprise", "contain", or any other variations are intended to encompass non-exclusive inclusion. This means that processes, methods, items, or devices that comprise a series of elements not only contain those elements explicitly listed but also encompass other elements that are not explicitly mentioned or inherently part of such processes, methods, items, or devices.

The technical solutions of the present disclosure will be described in detail below in conjunction with the drawings.

Referring to FIG. 1, FIG. 1 is a schematic diagram illustrating a register configuration system 100 in the embodiment of the present disclosure. The register configuration system 100 comprises a display processing unit 110, memory 130, and a hardware automatic control unit 120.

Referring to FIG. 2, the display processing unit 110 comprises multiple registers.

Optionally, within the display processing unit 110, at least one data path is comprised, and when the display processing unit 110 comprises multiple data paths, different data paths comprise different registers.

The display processing unit 110 can be of any existing type of display processing unit 110. No limitation is made herein as to the specific type of display processing unit 110.

The memory 130 comprises at least one pre-stored configuration instruction, wherein the configuration instruction is configured to indicate the target registers that need to be configured in the display processing unit 110.

The memory 130 can be of any existing type of memory 130. For example, it can be a USB flash drive, external hard drive, read-only memory 130 (ROM), random access memory 130 (RAM), magnetic disk, optical disk, or any other medium that can store program code. No specific limitations are placed on the type of memory 130 herein.

A hardware automatic control unit 120 is provided. The hardware automatic control unit 120 is connected to a register configuration interface of the display processing unit 110. The hardware automatic control unit 120 is configured to receive a startup command and, based on the startup command, retrieve and parse the configuration instructions from the memory 130. Based on the parsed configuration instructions, the hardware automatic control unit configures the target registers in the display processing unit 110. The startup command comprises the storage address of the configuration instructions.

The hardware automatic control unit 120 can be a PDMA (Programming Direct Memory Access), but it is not a limitation.

In one embodiment, the specific connection of the hardware automatic control unit 120 with the display processing unit is shown in FIG. 2.

The hardware automatic control unit 120 is connected separately to the pre-processor (as shown in FIG. 2 as "Pre-processor"), crossbar switch matrix (as shown in FIG. 2 as "Crossbar"), post-processor (as shown in FIG. 2 as "Post-processor"), and the output interface (as shown in FIG. 2 as "Output Interface") of the display processing unit 110. By sending instructions to at least one of the pre-processors, crossbar switch matrix, post-processor, or output interface, the configuration of registers in the display processing unit 110 is achieved. The hardware automatic control unit 120 obtains the startup command and the configuration instruction through a bus interface (as shown in FIG. 2 as "BUS Interface").

Compared to existing technology where the CPU sends instructions to the display processing unit, and the display processing unit then distributes the instructions sent by the CPU to the pre-processor, crossbar switch matrix, post-processor, and output interface to configure the registers in the display processing unit, the solution eliminates the need for the display processing unit to perform data distribution. As a result, it can enhance the efficiency of register configuration.

Optionally, the hardware automatic control unit 120 can be set as an independent unit, or the hardware automatic control unit 120 can be integrated into the display processing unit 110.

In one embodiment, the configuration instructions comprise register addresses, so as to facilitate the hardware automatic control unit 120 in subsequent determining and configuring the target registers based on those addresses.

To facilitate parsing of the configuration instructions by the hardware automatic control unit 120, optionally, the configuration instructions can also comprise an instruction type.

The instruction type can represent the type of the configuration instruction, such as 16-bit instructions, 32-bit instructions, and so on. This is provided for merely easy understanding and should not be considered a limitation on the present disclosure.

In one embodiment, multiple configuration instructions can be stored in memory 130 as an instruction list. In this case, to distinguish between different configuration instructions, the configuration instruction further comprises an instruction end flag.

Typically, the instruction end flag is positioned at the end of each configuration instruction. Upon reading the instruction end flag, it can be confirmed that the entire content of the current configuration instruction has been fully read.

The instruction end flag can be a string or binary encode formed by characters. The specific implementation of the instruction end flag is not limited herein.

Optionally, in some special applications, multiple different display regions need to be started multiple times within a single frame. Since this operation is highly time-sensitive, it requires the hardware automatic control unit 120 to automatically trigger and interact with different hardware blocks in the display processing unit 110 to fully automate the process of multiple startups. Therefore, a flag representing the end of configuration data for a particular image region can be set within the instruction end flag.

Upon reading the flag representing the end of configuration data for the current image region, the hardware automatic control unit 120, according to the flag, can automatically jump to the offset position of the next image region and proceed to control the parsing, configuration, and execution of the next set of configuration instructions.

For clarity, one possible embodiment of the instruction end flag is shown in FIG. 3. "Next section size" represents the size of the next image region, and "Next section address offset" represents the offset address of the next image region. Upon reading "Next section size" and "Next section address offset," it is possible to determine and jump to the offset position of the next image region.

LSB (Least Significant Bit) refers to the least significant bit in a binary number. MSB (Most Significant Bit) refers to the most significant bit in a binary number. In general, the MSB is located on the leftmost side of the binary number and the LSB is located on the rightmost side of the binary number.

This is provided for merely easy understanding and should not be considered as a limitation on the present disclosure.

Optionally, any data beyond the instruction end flag can be considered invalid data.

To reduce the number of configuration instructions, in one embodiment, the register address within the configuration instructions can be represented by the number of the target registers whose addresses are consecutive, the offset address of the first target register, and the instruction text.

Optionally, the instruction text, in addition to representing the register address, can also store other information, such as register configuration commands, the number of registers, and so on. No limitation is placed here on what is comprised in the instruction text.

Optionally, the instruction text is able to record the calculation method for the actual configuration address of each target register.

In one embodiment, the configuration instructions comprise the instruction type, the number of the target registers whose addresses are consecutive, the offset address of the first target register, the instruction text, and an instruction end flag.

The specific functions and principles of the instruction type, the number of the target registers whose addresses are consecutive, the offset address of the first target register, the instruction text, and the instruction end flag are the same as previously described. To avoid redundancy, further details are not reiterated here.

Figures 4, 5, 6, 7:
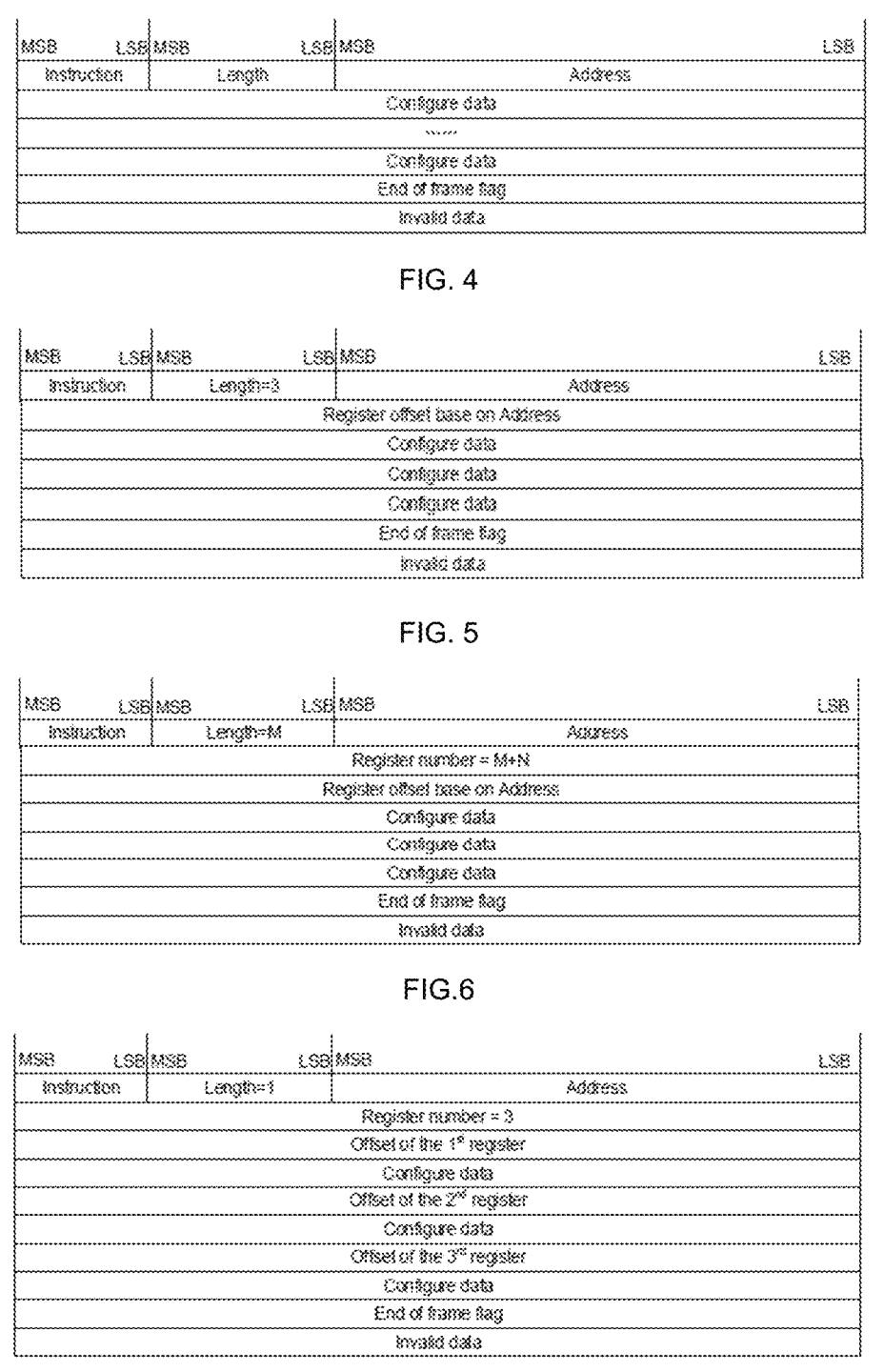

The structure of the configuration instruction is shown in FIG. 4. "Instruction" is the instruction type, "Length" is the number of the target registers whose addresses are consecutive, "Address" is the offset address of the first target register, "Configure data" is the instruction text, "End of frame flag" is the instruction end flag, and "Invalid data" is the invalid data.

Optionally, when the instruction text records the calculation method for the actual configuration address of each target register, the hardware automatic control unit 120 is specifically configured to parse the configuration instruction based on the instruction type, so as to obtain the number of the target registers, the offset address of the first target register, the instruction text, and the instruction end flag. According to the number of the target registers whose addresses are consecutive, the offset address of the first target register, and the calculation method provided in the instruction text, the actual configuration address for each target register is determined. Subsequently, each target register is configured based on the actual configuration address of each target register.

To help understand the specific process by which the hardware automatic control unit 120 determines the target register address based on the configuration instruction, an example configuration instruction, as shown in FIG. 5, is provided for explanation.

As shown in FIG. 5, "Length=3" indicates that there are three target registers whose addresses are consecutive, "Address" represents the offset address of the first target register, and the instruction text records "Register offset base on Address," which represents the offset for these three consecutive registers based on the offset address of the first target register. Therefore, the actual offset of the first target register is "Address+Register offset base on Address". Subsequently, based on the sum of the preset base address and the actual offset of the first target register, the actual configuration address of the first target register can be obtained.

Since these three target registers are consecutive, adding 1 to the actual configuration address of the first target register gives the actual configuration address of the second target register; and adding 2 to the actual configuration address of the first target register gives the actual configuration address of the third target register.

This is provided for merely easy understanding and should not be considered a limitation on the present disclosure.

Due to the limited length of the field in the configuration instruction configured to record the number of the target registers whose addresses are consecutive, there might be situations where the number of consecutive target registers is too large, and as a result, the field in the configuration instruction configured to record the number of the target registers whose addresses are consecutive may not be fully represented.

In such cases, the instruction text can also record the calculation method for the total number of the target registers whose addresses are consecutive. Correspondingly, the hardware automatic control unit 120 is specifically configured to determine the total number of the target registers whose addresses are consecutive based on the number of the target registers whose addresses are consecutive and the calculation method for the total number of the target registers. According to the total number of the target registers whose addresses are consecutive, the offset address of the first target register, and the instruction text, the actual configuration address for each target register is determined.

The calculation method based on the number of the target registers whose addresses are consecutive and the total number of the target registers can involve recording a second quantity of the target registers whose addresses are consecutive in the instruction text. Then, the second quantity of the target registers whose addresses are consecutive is added to the number of the target registers, recorded in the configuration instruction, whose addresses are consecutive. Therefore, the total number of the target registers whose addresses are consecutive is obtained.

For ease of understanding, the configuration instruction shown in FIG. 6 is used as an example.

"Length=M" indicates that there are M target registers whose addresses are consecutive, where M is a positive integer. "Register number=M+N" indicates that the total number of the target registers whose addresses are consecutive is M+N, wherein N is a positive integer. The rest of the information in FIG. 6 operates on principles similar to those mentioned in FIG. 5. For brevity, these are not elaborated further here.

This is provided for merely easy understanding and should not be considered a limitation on the present disclosure.

It is important to note that the specific implementation of the configuration instruction in the present disclosure is not restricted to the examples provided.

Optionally, in situations where there are multiple non-consecutive target registers, the instruction text can also record the offset of each target register.

For every target register, according to its own offset, the offset address of the first target register, and a preset base address, the actual configuration address for each of these target registers can be determined.

Optionally, the number of non-consecutive target registers can also be recorded in the instruction text.

For ease of understanding, the configuration instruction shown in FIG. 7 is used as an example.

As shown in FIG. 7, "Length=1" indicates that there is one target register whose address is consecutive. "Address" is the offset address of the first target register. The instruction text records "Register number=3," which represents that there are three non-consecutive target registers. "Offset of the 1st register", "Offset of the 2nd register", and "Offset of the 3rd register" represent the offset of each of the three non-consecutive target registers based on the offset address of the first target register.

Therefore, the actual offset of the first target register is "Address+Offset of the 1st register". Subsequently, based on the sum of the preset base address and the actual offset of the first target register, the actual configuration address of the first target register can be obtained.

Similarly, the actual offset of the second target register is "Address+Offset of the 2nd register". The actual offset of the third target register is "Address+Offset of the 3rd register".

In FIG. 7, "Configure data" recorded in the instruction text indicates configuration data.

This is provided for merely easy understanding and should not be considered a limitation on the present disclosure.

In one embodiment, the hardware automatic control unit 120 is connected to the interaction interface of each data path of the display processing unit 110, wherein different data paths comprise different registers.

The hardware automatic control unit 120 is further configured to send a configuration start command representing the start of configuring the target registers to the data paths and to receive configuration status signals fed back from the data paths. The configuration status signals represent whether all the registers included in the data paths have completed their configuration.

The configuration status signal can be either a termination feedback signal or an incomplete configuration signal.

The incomplete configuration signal can also comprise information such as the number of the registers that have not been configured, their storage addresses, and so on.

Optionally, in the case where the display processing unit 110 comprises multiple data paths, the hardware automatic control unit 120 is further configured to record the configuration status of the registers in each data path based on the configuration status signals fed back by each data path. The configuration status represents whether the registers have completed their configuration. The hardware automatic control unit 120, by recording the configuration status of the registers in each data path, facilitates the subsequent determination of which data paths still require register configuration.

In one embodiment, when the display processing unit 110 comprises multiple data paths, the hardware automatic control unit 120 is further configured to record its own information about the target registers that have been configured in the display processing unit 110.

For example, it can record information such as the offset address or actual configuration address of the target registers that have been configured. Examples are given herein only for ease of understanding and should not be taken as a limitation of the present disclosure, as long as the recorded information can uniquely represent the target register.

Based on the recorded information, it is possible to determine the target registers in each data path that have not yet been configured, thus facilitating the subsequent determination of which registers in which data paths still need configuration.

In one embodiment, the register configuration system 100 further comprises a central processing unit 140, as shown in FIG. 8.

The central processing unit 140 is connected to the hardware automatic control unit 120, wherein the central processing unit 140 is configured to send a startup command to the hardware automatic control unit 120.

The startup command is configured to instruct the hardware automatic control unit 120 to start up and begin register configuration.

Optionally, the hardware automatic control unit 120 can be further configured to transmit its internal status to the central processing unit 140.

In response, based on the status received from the hardware automatic control unit 120, the central processing unit 140 determines if there are any anomalies in the hardware automatic control unit 120. If an anomaly is detected in the hardware automatic control unit 120, an interrupt command is sent to the hardware automatic control unit 120. The interrupt command is configured to instruct the hardware automatic control unit 120 to stop working.

By monitoring the internal status of the hardware automatic control unit 120 through the central processing unit 140, it is possible to send an interrupt command to the hardware automatic control unit 120 if any anomalies are detected in the hardware automatic control unit 120, thereby causing the hardware automatic control unit 120 to stop working. The reliability of the register configuration system 100 is improved by preventing register configuration errors caused by abnormalities in the hardware automatic control unit 120.

The central processing unit 140 can be of any type of central processing unit (CPU). There are no specific restrictions placed on the model of the central processing unit 140 in this context.

Figure 9:
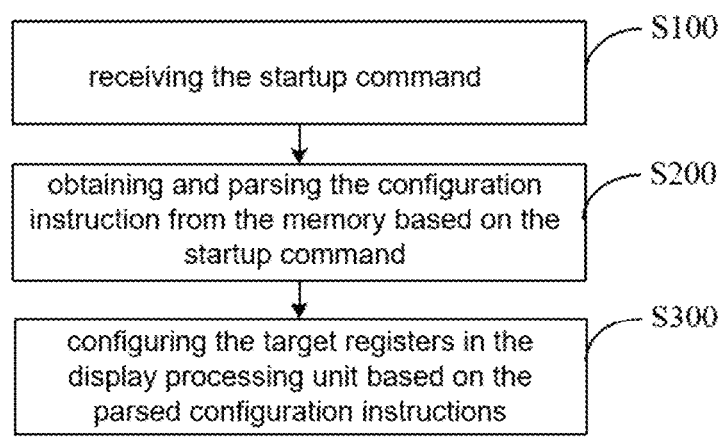
FIG. 9 is a flowchart of a register configuration method shown in the embodiments of the present disclosure.

Based on the same technical concept, the present disclosure further provides a method for register configuration. The register configuration method is applied to the hardware automatic control unit 120 in the previously described register configuration system 100. As shown in FIG. 9, the steps contained in it will be explained in conjunction with FIG. 9.

S100: receiving the startup command.

In this step, the startup command comprises the storage address of the configuration instruction.

Optionally, the startup command can be sent by the central processing unit to the hardware automatic control unit.

S200: obtaining and parsing the configuration instruction from the memory based on the startup command.

Upon receiving the startup command, the configuration instruction can be obtained based on the storage address that is included in the startup command. By parsing the configuration instruction, the actual configuration address of the target register can be obtained, and the target register is configured based on that actual configuration address.

The specific implementations for determining the configuration instruction and parsing the configuration instruction to get the actual configuration address of the target register have been detailed previously, so for brevity, they will not be reiterated here.

S300: configuring the target registers in the display processing unit based on the parsed configuration instructions.

By parsing the configuration instruction, the actual configuration address of the target register can be obtained, and the target register is configured based on that actual configuration address.

The specific methods and logic for configuring the target register are well-known to those skilled in the art, so they will not be further elaborated on here for the sake of brevity.

The principles and technical effects of the register configuration method provided in the embodiments of the present disclosure are similar to those embodiments described for the register configuration system. If any part of the method embodiment is not explicitly mentioned, the corresponding content in the embodiments of the register configuration system can be referred to.

Based on the same technical concept, the present disclosure also provides an electronic device, wherein the electronic device comprises the previously described register configuration system.

The specific implementation and principles of the register configuration system have been detailed in the previous text and will not be reiterated here for the sake of brevity.

The electronic device can be a computer, server, or any other electronic device that requires the configuration of registers in a display processing unit. The specific type of electronic device is not limited here.

The above is only a preferred embodiment of the present disclosure, which is not intended to limit, and the present disclosure may have various changes and variations for those skilled in the art. Any modification, equivalent substitution, improvement, etc. made within the spirit and principles of the present disclosure shall be comprised in the scope of protection of the present disclosure.

What is claimed is:

1. A register configuration system, wherein the system comprises:
    a display processing unit, wherein the display processing unit comprises multiple registers;
    a memory, wherein the memory comprises at least one pre-stored configuration instruction, wherein the configuration instruction is configured to indicate target registers that need to be configured in the display processing unit; and
    a hardware automatic control unit, wherein the hardware automatic control unit is connected to a register configuration interface of the display processing unit; the hardware automatic control unit is configured to receive a startup command and, based on the startup command, retrieve and parse the configuration instruction from the memory; after parsing the configuration instruction, the hardware automatic control unit configures the target registers in the display processing unit; and the startup command comprises a storage address of the configuration instruction; and
    the configuration instruction comprises an instruction type, a number of target registers whose addresses are consecutive, an offset address of a first target register, an instruction text, and an instruction end flag.

2. The register configuration system according to claim 1, wherein the hardware automatic control unit is further connected to an interaction interface of each data path of the display processing unit and different data paths comprise different registers; and
    the hardware automatic control unit is further configured to send a configuration start command representing a start of configuring the target registers to the data paths and to receive a configuration status signal fed back from the data paths; and the configuration status signal represents whether all registers comprised in the data paths have completed their configuration.

3. The register configuration system according to claim 2, wherein the display processing unit comprises multiple data paths; the hardware automatic control unit is further configured to record a configuration status of registers comprised in each data path based on the configuration status signal fed back by each data path; and the configuration status represents whether the registers have completed their configuration.

4. The register configuration system according to claim 1, wherein the register configuration system further comprises:
    a central processing unit, wherein the central processing unit is connected to the hardware automatic control unit and the central processing unit is configured to send the startup command to the hardware automatic control unit.

5. The register configuration system according to claim 4, wherein the hardware automatic control unit is further configured to transmit its internal status to the central processing unit; and
    the central processing unit determines whether the hardware automatic control unit is functioning properly based on a received status of the hardware automatic control unit; and in case of any anomalies in the hardware automatic control unit, the central processing unit sends an interrupt command to the hardware automatic control unit, wherein the interrupt command is configured to instruct the hardware automatic control unit to stop working.

6. The register configuration system according to claim 1, wherein the instruction text records a calculation method for an actual configuration address of each target register; and
    the hardware automatic control unit is configured to parse the configuration instruction based on the instruction type, so as to obtain the number of the target registers, the offset address of the first target register, the instruction text, and the instruction end flag; according to the number of the target registers whose addresses are consecutive, the offset address of the first target register, and the calculation method provided in the instruction text, the actual configuration address for each target register is determined; and each target register is configured based on the actual configuration address of each target register.

7. The register configuration system according to claim 6, wherein the instruction text further records a calculation method for a total number of the target registers whose addresses are consecutive; and
    the hardware automatic control unit is configured to determine the total number of the target registers whose addresses are consecutive based on the number of the target registers whose addresses are consecutive and the calculation method for the total number of the target registers; and according to the total number of the target registers whose addresses are consecutive, the offset address of the first target register, and the instruction text, an actual configuration address for each target register are determined.

8. A register configuration method, applied to the hardware automatic control unit in the register configuration system according to claim 1, wherein the method comprises:
    receiving the startup command;
    obtaining and parsing the configuration instruction from the memory based on the startup command; and
    configuring the target registers in the display processing unit based on the parsed configuration instruction.

9. An electronic device, comprising:
    the register configuration system according to claim 1.

* * * * *